Feb. 10, 1942.  R. P. SCHERER  2,272,328
MECHANISM FOR FORMING CAPSULES
Original Filed Oct. 28, 1935   2 Sheets-Sheet 2
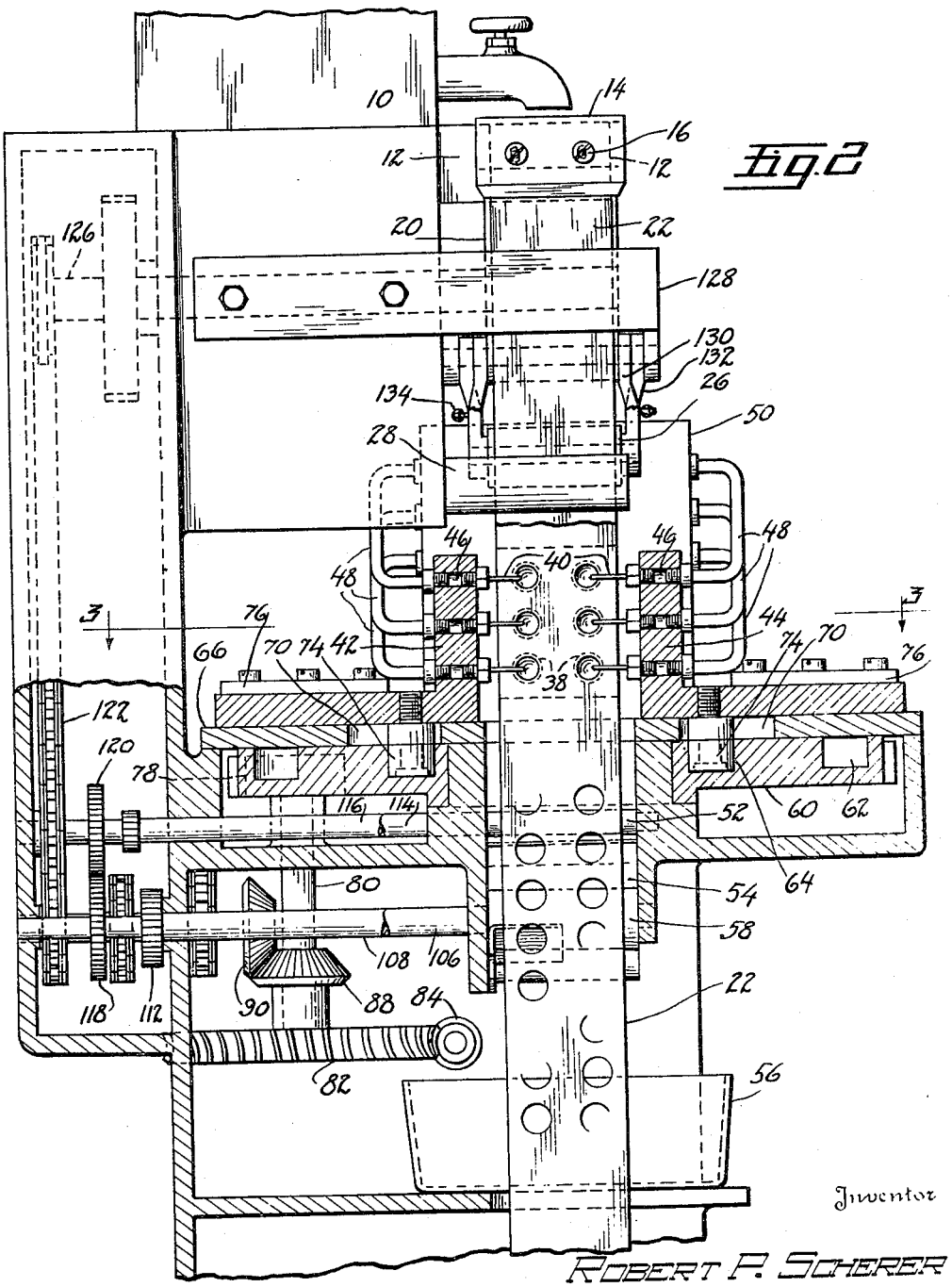
Inventor
ROBERT P. SCHERER
By
Parker & Burton
Attorneys Patented Feb. 10, 1942

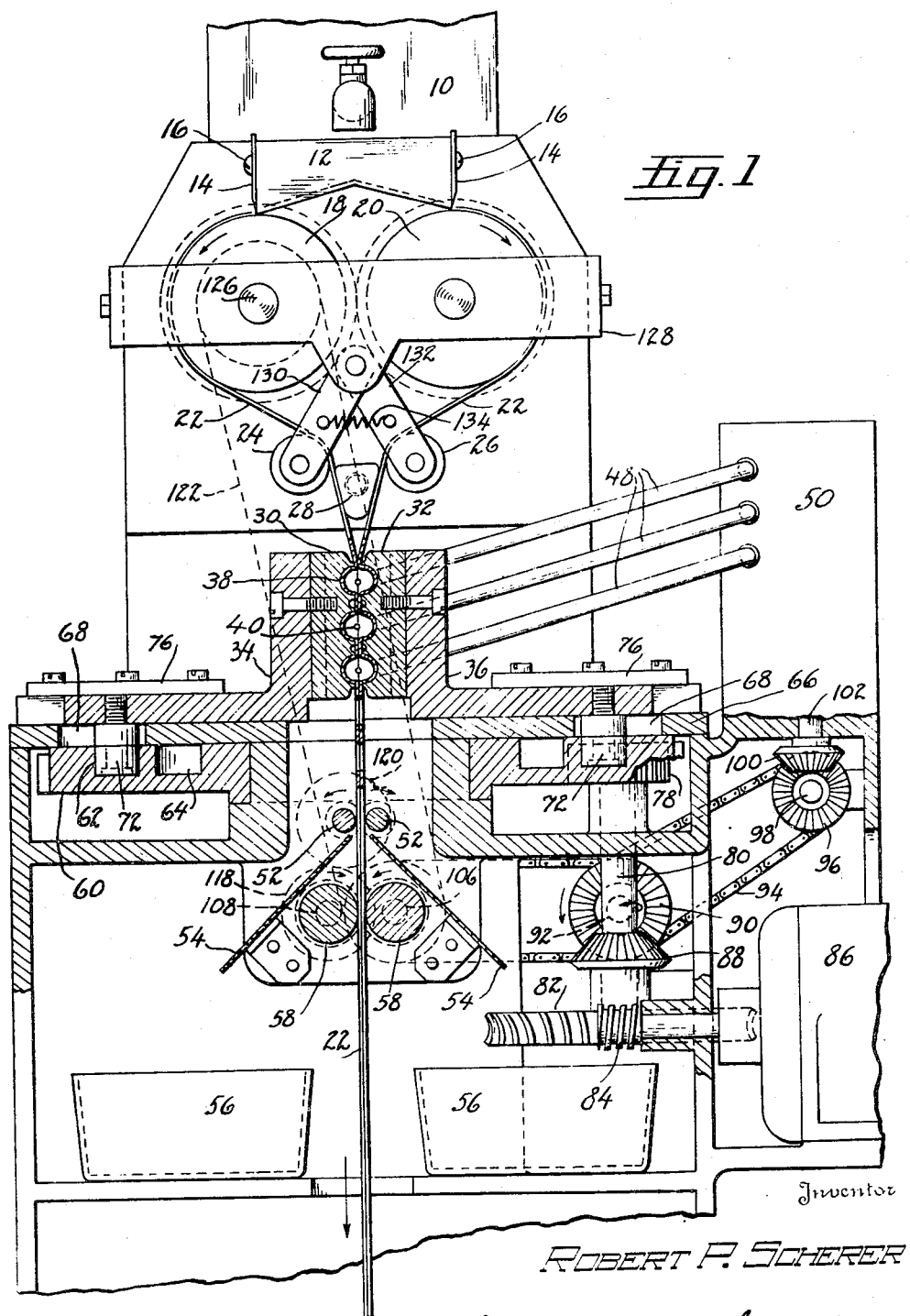

2,272,328

UNITED STATES PATENT OFFICE 2,272,328

MECHANISM FOR FORMING CAPSULES

Robert P. Scherer, Detroit, Mich.

Original application October 28, 1935, Serial No. 47,094. Divided and this application January 20, 1939, Serial No. 251,943

3 Claims. (Cl. 18—21)

This invention relates to improvements in capsule forming and filling mechanism and constitutes a division of my application Serial No. 47,094, filed October 28, 1935.

The object of the application of which this is a division is to provide improved apparatus whereby capsules such as gelatin capsules may be formed and filled as a continuous operation. The forming of the capsules and the filling thereof are simultaneously carried out. In the forming of capsules a pair of gelatin films or strips are fed continuously and into juxtaposition with each other to form therefrom capsules. These films are likewise fed into juxtaposition with forming mechanism to shape the films to form the capsule bodies and into juxtaposition with said mechanism to fill the capsule bodies.

The subject matter of this divisional application refers to forming and feeding of these two capsule forming films or strips into such juxtaposition. This application does not relate to the shaping of the capsule bodies from the films or the feeding of the capsule content material into said capsule bodies, all of which forms the subject matter of the parent application Serial No. 47,094.

The object of this divisional application is to provide simple, inexpensive mechanism adapted to form and feed two capsule forming films or strips of controlled thickness and of a plastic nature such as molten gelatin or other suitable plastic material into juxtaposition for capsule formation.

Other objects, advantages, and meritorious features of this invention will more fully appear from the following description, appended claims and accompanying drawings wherein:

Figure 1 is a front view partly cross sectional of the apparatus showing the manner of feeding the strips of plastic material between the dies, and Fig. 2 is a side view partly in cross section illustrating the manner of injecting capsule filling material between the strips of plastic material.

The complete apparatus and its functioning is fully described in my copending application supra and reference is made thereto for a description of the detail of such functioning and mechanism as pertains to apparatus or movements not forming subject matter of this particular application.

In the construction shown there is a vat 10 wherein plastic material such as molten gelatin may be maintained at the desired temperature by heating means not here illustrated. Any suitable heating means may be employed. The gelatin is delivered therefrom in a controlled stream into a discharge pan or feeding tank 12 having a deformed bottom which is shaped as shown in Fig. 1 sloping from an intermediate line toward two opposite side walls to cause the molten gelatin contents of the tank to divide and flow to opposite sides of the pan or tank. The side walls 14 of this pan are vertically adjustable by means of a screw slidably fitted in a slot as generally indicated at 16 in Fig. 2 to regulate the thickness of the film of gelatin issuing from the opening provided between the side and bottom walls of the tank. The lower edge of the walls 14 are knife edged and allow the gelatin to pass thereunder in thin regulated films and onto the peripheries of two cooling drums 18 and 20. The drums are driven to rotate outwardly away from each other by mechanism to be hereinafter described.

The solidified strips or bands 22 of gelatinous material are advanced along converging paths assisted by the yieldingly mounted rollers 24 and 26. An electric heating element 28 having a heating coil therein is arranged between the strips of plastic material just prior to complete convergence in order to maintain the strips in a plastic condition.

The converging strips or sheets of plastic material are advanced side by side between a pair of opposed plane faced die members 30 and 32 secured in any satisfactory manner to frame supports 34 and 36 respectively each mounted for reciprocating movement toward and away from one another.

Briefly, the gelatin films or strips 22 pass from the rollers 24 and 26 between cooperating dies 30 and 32 carried by reciprocating elements 34 and 36. From a suitable pressure source 50 capsule content material is fed through flexible conduits 48, passageways 46 in reciprocating supports 42 and 44 and hollow injection needles 40 carried by said supports into the capsule bodies formed between said dies from the films 22.

The functioning of the dies and injection needles is synchronized by a driven gear 60 which is provided with cam guides 62 and 64 wherein cam rollers 72 and 74 of the reciprocating die members and needle injection elements are located. Guide plates 66 provided with slots 68 and 70 superimposing the cam guides 62 and 64 itself superimposes the gear wheels 60. Guides 76 maintain alignment of the dies and injection devices.

Gear wheel 60 is driven by power means such as electric motor 86 through gear drive 84, gears 78 and 82, and shaft 80. The shaft 102 of pump 50 may be driven from the same motor through shaft 80, gears 88 and 90, shaft 92, chain drive 94, shaft 96, and gears 98 and 100. This die and feed mechanism and the drive therefor is fully described in detail in my copending application Serial No. 47,094 and forms no part of the invention here claimed.

The drive for the large feed rollers or drums 18 and 20 consists of a chain 122 coupling shaft 106 with the shaft 126 to which drum 18 is secured. The chain drive is indicated in dotted lines 122 in Fig. 1. Drum 20 is geared in any obvious manner to its companion drum 18.

The bracket 128 extends around the drums 18 and 20 and is provided with a depending portion to which the links 130 and 132 are pivoted. These links are resiliently urged toward one another by spring 134 and the rollers 24 and 26 secured to their links yieldingly draw the strip of gelatinous material toward each other and closely about the drums 18 and 20.

Rollers 52 which assist in extracting filled capsules from the juxtaposed strips 22 to travel over chutes 54 into containers 56 and rollers 58 which assist in feeding said juxtaposed films 22 forward may likewise be driven from shaft 106 by means of chain drive 104, shaft 92, shaft 108, gears 110 and 112, shafts 114 and 116, and gears 118 and 120, all as fully described in said earlier copending application. The operation of the mechanism is also fully described in said copending application.

What I claim is:

1. Capsule forming mechanism including, in combination, a tank for molten capsule forming material having a bottom and two opposite side walls spaced slightly above the bottom providing a pair of discharge slits, a pair of casting drums rotatably supported below said tank upon parallel axes substantially in vertical line with said two side walls of the tank, said tank bottom sloping upwardly and inwardly from each side wall toward a line superposing the space between said drums.

2. In capsule forming mechanism, a feeding tank for molten capsule forming material, said tank having a bottom and two opposite side walls, each side wall spaced above the bottom providing a discharge opening between each side wall and said bottom, a pair of casting drums rotatably disposed underneath said tank, one drum disposed in line with and underneath one discharge opening, the other drum disposed in line with and underneath the other discharge opening, driving means coupled with said drums to rotate them outwardly away from each other, said tank bottom sloping upwardly and inwardly from each of said side walls toward a line superposing the space between said drums, cooperating capsule mold members disposed in line with and underneath the space between said drums, and a pair of film engaging rollers rotatably supported below the drums and above the mold members for shifting movement toward and away from each other, said rollers supported upon substantially parallel axes extending substantially parallel to the axes of the drums, and means acting upon said rollers yieldingly resisting shifting movement of the rollers away from each other.

3. In capsule forming mechanism, a pair of film casting drums rotatably disposed upon substantially parallel axes, a tank adapted to contain molten capsule forming material superposing said drums and provided with two discharge openings, one discharge opening superposing one drum and extending substantially parallel to the axis of the drum, the other discharge opening superposing the other drum and extending substantially parallel to the axis of said drum, said tank bottom sloping from each opening inwardly and upwardly to a line superposing the space between said drums, a pair of film engaging rollers rotatably supported upon substantially parallel axes extending substantially parallel to the drum axis below said drums, means supporting said film engaging rollers for shifting movement toward and away from each other and means acting upon said film engaging rollers yieldingly resisting shifting movement of the rollers away from each other.

ROBERT P. SCHERER.